(12) United States Patent
Chang et al.

(10) Patent No.: US 7,806,979 B2
(45) Date of Patent: Oct. 5, 2010

(54) COATING COMPOSITION FOR PROTECTING DAZZLING EFFECT

(75) Inventors: Yeong-Rae Chang, Daejeon (KR);
Yea-Mo Koo, Gimpo (KR); Sung-Hoon Jang, Daejeon (KR)

(73) Assignee: LG Chem, Ltd. (KR)

( * ) Notice: Subject to any disclaimer, the term of this patent is extended or adjusted under 35 U.S.C. 154(b) by 691 days.

(21) Appl. No.: 10/504,609

(22) PCT Filed: Jan. 29, 2003

(86) PCT No.: PCT/KR03/00205

§ 371 (c)(1),
(2), (4) Date: Aug. 19, 2005

(87) PCT Pub. No.: WO03/068876

PCT Pub. Date: Aug. 21, 2003

(65) Prior Publication Data

US 2006/0047035 A1    Mar. 2, 2006

(30) Foreign Application Priority Data

Feb. 15, 2002    (KR) .................. 10-2002-0008230

(51) Int. Cl.
*C08K 5/00* (2006.01)
*C08K 5/24* (2006.01)
*B60C 1/00* (2006.01)
*B05D 3/02* (2006.01)

(52) U.S. Cl. .................. 106/499; 524/261; 427/372.2

(58) Field of Classification Search .................. 106/499; 428/212, 331, 354, 195; 427/372.2; 156/307; 524/261

See application file for complete search history.

(56) References Cited

U.S. PATENT DOCUMENTS

| | | | | |
|---|---|---|---|---|
| 4,948,690 A * | 8/1990 | Hisamura et al. | ............ | 430/60 |
| 5,073,587 A | 12/1991 | Edwards | .................. | 524/166 |
| 5,880,800 A * | 3/1999 | Mikura et al. | ............... | 349/122 |
| 6,033,743 A * | 3/2000 | Suzuki et al. | .............. | 428/1.31 |
| 6,066,684 A * | 5/2000 | Fujimoto et al. | .............. | 522/79 |
| 6,164,785 A | 12/2000 | Maekawa | ................... | 359/613 |
| 6,217,176 B1 | 4/2001 | Maekawa | | |
| 6,495,253 B1 * | 12/2002 | Koyama et al. | ............. | 428/343 |
| 2002/0114934 A1 * | 8/2002 | Liu et al. | .................... | 428/212 |
| 2003/0116270 A1 * | 6/2003 | Hawa et al. | .............. | 156/307.1 |

FOREIGN PATENT DOCUMENTS

| | | |
|---|---|---|
| DE | 4407321 | 9/1995 |
| EP | 0361109 | 4/1990 |
| EP | 0434115 | 6/1991 |
| JP | 59-058036 | 4/1984 |
| JP | 06-018706 | 1/1994 |
| JP | 07-181306 | 7/1995 |
| JP | 09-127312 | 5/1997 |
| JP | 10-20103 | 1/1998 |
| JP | 11-286083 | 10/1999 |
| JP | 11-305010 | 11/1999 |
| JP | 2000-338310 | 12/2000 |

OTHER PUBLICATIONS

Database WPI, Section Ch. Weel 19221, Derwent Publications Ltd., London, GB; AN 1992-172533, XP002320969, and JP 04 0110380 A (Sumitomo Cement Co) Apr. 10, 1992 (Oct. 1992).
International Search Report for International Application No. PCT/KR03/00205 dated May 16, 2003.
International Preliminary Examination Report for International Application No. PCT/KR2003/000205 dated Jun. 30, 2004.

* cited by examiner

*Primary Examiner*—Jerry Lorengo
*Assistant Examiner*—Pegah Parvini
(74) *Attorney, Agent, or Firm*—Cantor Colburn LLP

(57) ABSTRACT

The present invention relates to an antiglare coating composition, and more particularly to an antiglare coating composition comprising an acrylate binder resin, fine particles whose refractive index varies between 0.2 to 0.5 from the refractive index of the binder resin and whose average particle size ranges from 0.05 to 1 μm, and fine particles whose refractive index varies between 0.1 and whose average particle size ranges from 0.5 to 3 μm. A coating composition of the present invention has a superior antiglare effect, reduced image distortion, high contrast, and enhanced image clarity when applied to a high-resolution display by scattering and inducing internal diffusion of light.

12 Claims, No Drawings

COATING COMPOSITION FOR PROTECTING DAZZLING EFFECT

BACKGROUND OF THE INVENTION (a) Field of the Invention

The present invention relates to an antiglare coating composition, and more particularly relates to an antiglare coating composition having a superior antiglare effect, reduced image distortion, high contrast, and enhanced image clarity when applied to a high-resolution display.

(b) Description of the Related Art

With the advent of the information society, various sizes and types of displays are being developed for TVs, notebook computers, PCs, mobile phones, clocks, picture frames, etc. However, these displays have several problems when exposed to an external light such as a fluorescent light or sunlight. For instance, when an incident light is reflected from a surface of the display in one direction, the image contrast reduced and the reduced image contrast cause eye fatigue or headaches.

Conventionally, to solve the above-mentioned problems, method of scattering eternal light has been used by forming an uneven surface. Japan Patent Publication Nos. Sho 59-58036, Hei 6-18706, and Hei 9-127312 disclose methods of diffusing reflected light by inserting coagulated fine particles such as silica or polymer beads in the thermosetting resin to provide an uneven surface. Furthermore, embossing treatment method of the coated surface has been reported.

While these methods superior antiglare effect, these methods also gives rise to serious problems of image distortion when applied to a high-resolution display. Japan Patent Publication Nos. Hei 7-181306 and Hei 10-20103 disclose the antiglare film having fine surface roughness which is applicable to a high-resolution display. Although these methods reduced image distortion, the problem of decrease in contrast still did not be solved.

Therefore, the development of an antiglare coating composition having a superior antiglare effect, reduced image distortion, high contrast, and enhanced image clarity when applied to a high-resolution display is greatly needed.

SUMMARY OF THE INVENTION

An object of the present invention is to provide an antiglare coating composition having a superior antiglare effect, reduced image distortion, high contrast, and enhanced image clarity when applied to a high-resolution display.

In order to attain the object, the present invention provides an antiglare coating composition having a superior antiglare effect for a display comprising:
  a) 100 wt % of an acrylate binder resin;
  b) 2 to 30 wt % of fine particles having an average particle size of 0.05 to 1 µm, wherein the refractive index of the fine particles varies between 0.2 to 0.5 from the refractive index of the acrylate binder resin; and
  c) 1 to 20 wt % of fine particles having an average particle of 0.5 to 3 µm, wherein the refractive index varies within 0.1 from the refractive index of the acrylate binder resin.

DETAILED DESCRIPTION OF THE PREFERRED EMBODIMENTS

The present inventors worked to develop a coating composition having a superior antiglare effect, reduced image distortion, high contrast, and enhanced image clarity when applied to a high-resolution display. In doing so, they discovered that when the fine particles whose refractive index varies between 0.2 to 0.5 and between 0.1 from the refractive index of a binder resin are added to the binder resin, the coating composition shows superior antiglare effect, reduced image distortion, superior contrast, and distinct images.

Because of the large difference in refractive indices of coating layer and atmosphere, the image transmitted from display is greatly refracted in the outermost surface of coating layer, and interference between the transmitted images arises. However, inside of the film, the difference in refractive indices of the filler and the matrix is smaller than the difference in refractive indices of the coating layer and the atmosphere. The coating composition of the present invention should have a coated film with average surface roughness of 0.1 to 0.3 µm to prove superior antiglare effect with minimum image distortion.

In addition, control of internal and surface light diffusion is important for a high-resolution display. Particularly, when haze by internal scattering is between 15 to 40 and haze by internal scattering is less than 15, the coated film shows superior antiglare effect, minimum image distortion. Internal scattering is influenced by the content and size of fine particles whose refractive indices vary between 0.2 to 0.5 from the refractive index of the binder, while surface scattering is determined by the surface roughness. Therefore, two types of fine particles are required.

The present invention is characterized by a coating composition comprising an acrylate binder resin, fine particles whose refractive index varies between 0.2 to 0.5 from the refractive index of the binder and the average particle size of the fine particles size ranges from 0.05 to 1 µm, and fine particles whose refractive index varies between 0.1 from the refractive of the binder and average particle size of the fine particles size ranges from 0.5 to 3 µm.

The fine particles whose refractive index varying between 0.2 to 0.5 from the refractive index of the binder and whose average particle size ranging from 0.05 to 1 µm, and the fine particles whose refractive index varying between 0.1 from the refractive index of the binder and average particle size ranging from 0.5 to 3 µm used in the present invention can be selected from alumina (refractive index: 1.77), aluminum hydroxide (refractive index: 1.58), magnesium oxide (refractive index: 1.74), antimony oxide (refractive index: 2.18), or silica (refractive index: 1.48).

It is preferable that the fine particles whose refractive index varies between 0.2 to 0.5 from the refractive index of the binder resin and whose average particle size ranges from 0.05 to 1 µm are used at 2 to 30 wt % for 100 wt % of the binder resin. If the average particle size of the fine particles is smaller than 0.05 µm, light diffusion effects disappear. Otherwise, if the average particle size exceeds 1 µm, light blurring increases.

Also, it is preferable that the fine particles whose refractive index varies within 0.1 from the refractive index of the binder resin are used at 1 to 20 wt % for 100 wt % of the binder resin. If the average particle size of the fine particles exceeds 3 µm, light blurring increases.

Also, it is preferable that the acrylate binder resin used in the present invention comprises: i) up to 80 wt % of a reactive oligomer; ii) 10 to 100 wt % of a multifunctional monomer; and iii) up to 30 wt % of one or more bifunctional or monofunctional acrylates.

For the reactive oligomer, a urethane-modified oligomer, a polyester oligomer, an epoxy oligomer, etc. having 2 to 6 functional groups can be used. It is used up to 80 wt % for 100 wt % of the acrylate binder resin. If its content exceeds 80 wt %, abrasion resistance and scratch resistance decreases.

For the multifunctional monomer, an acrylate having more than 3 functional groups, such as dipentaerythritol hexaacrylate, pentaerythritol tetraacrylate, pentaerythritol triacrylate, and trimethylene propyl triacrylate, can be used. It is used at up to 10 wt % for 100 wt % of the acrylate binder resin. If its content is less than 10 wt %, abrasion and scratch resistance decrease.

The bifunctional or monofunctional acrylate and methacrylate decreases viscosity of the coating solution and offers softness to the coating film. Monofunctional acrylates like ethyl acrylate, butyl acrylate, isobonyl acrylate, octadecyl acrylate, 2-hydroxyethyl acrylate, etc.; monofunctional methacrylates like methyl methacrylate, butyl methacrylate, etc.; bifunctional acrylates like hexanediol diacrylate, dipropylene glycol diacrylate, triethylene glycol diacrylate, tripropylene glycol diacrylate, etc.; bifunctionalmethacrylates can be used. It is preferable that the bifunctional or monofunctional acrylate and methacrylate is used up to 30 wt % for 100 wt % of the acrylate binder resin.

An initiator and a solvent are also added to the coating composition of the present invention.

For the initiator, a thermal initiator or a UV initiator can be used. For the thermal initiator, peroxides of azo compounds, such as benzoyl peroxides and AIBN can be used. For the UV initiator, 1-hydroxy cyclohexylphenyl ketone, benzyl dimethyl ketal, hydroxydimethylacetophenone, benzoin, benzoin methyl ether, benzoin ethyl ether, benzoin isopropyl ether, benzoin butyl ether, etc. can be used. It is preferable that the initiator is used at 0.01 to 10 wt % for 100 wt % of the binder resin.

The solvent is used to offer coatability and adhesion property. Alcohols like methanol, ethanol, isopropanol, etc.; acetates like methyl acetate, ethyl acetate, butyl acetate, etc.; ketones like methyl ethyl ketone, methyl isobutyl ketone, acetone, etc.; cellusolves like methyl cellusolve, ethyl cellusolve, butyl cellusolve, etc.; dimethyl formamide; or tetrahydrofuran, etc can be used as the solvent. It is preferable that the solvent is used at 10 to 200 wt % for 100 wt % of the binder resin.

A composition of the present invention may further comprise a leveling agent, a wetting agent, an antifoaming agent, etc. to offer other properties such as coatability.

A coating solution prepared by the present invention can be applied on a variety of matrices. For example, transparent films such as triacetyl cellulose, polyester or Sheets such as polymethylmethacrylate (PMMA), polycarbonate (PC), etc. can be used. Antiglare coating composition of the present invention provide good results when the coating composition is used for polarizers for LCDs, protection filters for RPTVs, eye protectors for PC users, etc.

A coating composition of the present invention is coated on a film by roll coating. Specifically, gravure coating, reverse gravure coating, comma coating, reverse comma coating, rib coating, wire bar coating, etc. can be used for films. For sheets, dip coating, spray coating, flow coating, spin coating, etc. can be used. Preferably, the thickness of the coating film ranges from 1 to 20 μm, depending on the field of application. The coated matrix is pre-dried in oven at 50 to 80° C. to remove the solvent, and then hardened with a UV curing machine. It is preferable that the UV irradiation amount ranges from 400 to 2000 mJ/cm$^2$.

Hereinafter, the present invention is described in more detail through Examples and Comparative Examples. However, the following Examples are only for the understanding of the present invention, and the present invention is not limited by the following Examples.

EXAMPLES

Example 1

10 wt % of alumina (AL-41 DBM-01; Sumitomo Chemical) having a refractive index of 1.77 and an average particle size of 1 μm as fine particles; 2 wt % of 2-hydroxy cyclohexylphenylketone as a UV initiator; 20 wt % of isopropyl alcohol, 20 wt % of ethyl acetate, and 20 wt % of butyl cellusolve as a solvent; 0.3 wt % of a wetting agent (Tego 453; Tego); and 0.3 wt % of a leveling agent (BYK 300; BYK) were mixed in a binder resin containing 80 wt % of dipentaerythritolhexaacrylate (DPHA) and 20 wt % of 2-hexanediolacrylate (2-HEA). The refractive index of the binder resin was 1.48.

The coating solution was dispersed with a milling machine, so that the final average particle size of the alumina was 0.4 μm.

7 wt % of silica having a refractive index of 1.48 and an average particle size of 1 μm was dispersed in 30 wt % of isopropyl alcohol and 10 wt % of butyl cellusolve, and mixed with the coating solution to prepare a coating composition for preventing a dazzling effect.

Example 2

10 wt % of magnesium oxide (Premier) having a refractive index of 1.74 and an average particle size of 4 μm as fine particles; 2 wt % of 2-hydroxy cyclohexylphenylketone as a UV initiator; 20 wt % of isopropyl alcohol, 20 wt % of ethyl acetate, and 20 wt % of butyl cellusolve as a solvent; 0.3 wt % of a wetting agent (Tego 453; Tego); and 0.3 wt % of a leveling agent (BYK 300; BYK) were mixed in a binder resin containing 80 wt % of dipentaerythritolhexaacrylate (DPHA) and 20 wt % of 2-hexanediolacrylate (2-HEA). The refractive index of the binder resin was 1.48.

The coating solution was dispersed with a milling machine, so that the final average particle size of the alumina was 0.6 μm.

7 wt % of silica having a refractive index of 1.48 and an average particle size of 1 μm was dispersed in 30 wt % of isopropyl alcohol and 10 wt % of butyl cellusolve, and mixed with the coating solution to prepare a coating composition for preventing a dazzling effect.

Comparative Example 1

10 wt % of silica having a refractive index of 1.48 and an average particle size of 1 μm as fine particles; 2 wt % of 2-hydroxy cyclohexylphenylketone as a UV initiator; 50 wt % of isopropyl alcohol, 20 wt % of ethyl acetate, and 30 wt % of butyl cellusolve as a solvent; 0.3 wt % of a wetting agent (Tego 453; Tego); and 0.3 wt % of a leveling agent (BYK 300; BYK) were mixed in a binder resin containing 80 wt % of dipentaerythritolhexaacrylate (DPHA) and 20 wt % of 2-hexanediolacrylate (2-HEA). The refractive index of the binder resin was 1.48.

Comparative Example 2

10 wt % of aluminum hydroxide having a refractive index of 1.58 and an average particle size of 1 μm, and 7 wt % of silica having a refractive index of 1.48 and an average particle size of 1 μm as fine particles; 2 wt % of 2-hydroxy cyclohexylphenylketone as a UV initiator; 50 wt % of isopropyl alcohol, 20 wt % of ethyl acetate, and 30 wt % of butyl cellusolve as a solvent; 0.3 wt % of a wetting agent (Tego 453; Tego); and 0.3 wt % of a leveling agent (BYK 300; BYK) were mixed in a binder resin containing 80 wt % of dipentaerythritol-hexaacrylate (DPHA) and 20 wt % of 2-hexanediolacrylate (2-HEA). The refractive index of the binder resin was 1.48.

Test Example

Coating compositions prepared in Examples 1 and 2 and Comparative Examples 1 and 2 were coated on a triacetyl cellulose film using a No. 5 wire bar. The film was dried for 2 minutes in a 50° C. oven and hardened with 1 J/cm$^2$ of UV energy. Physical properties including gloss, haziness, internal haze, surface haze, transmittance, image clarity, sparkling, and black density of the coated film were tested. The results are shown in Table 1.

a) Haze and transmittance—HR-100 (Murakami) was used.

Internal haze was determined after attaching cellophane on the film surface to remove roughness of the film. Surface haze was obtained by subtracting the internal diffusion haze from the total haze.

b) Image clarity—ICM-1 (Suga) was used. Distinctness of an image passing through 4 slits (0.125 mm, 0.25 mm, 0.5 mm and 2.0 mm) was added. The higher the sum, the better the distinctness.

c) Sparkling—The film was attached on a LCD module and sparkling was observed by human eye.

d) Black density—A black tape was attached on the back of the film, and black density was evaluated with Macbeth RD198.

TABLE 1

| Classification | Example 1 | Example 2 | Comparative Example 1 | Comparative Example 2 |
|---|---|---|---|---|
| Gloss (%) | 62 | 59 | 59 | 60 |
| Haze (%) | 34.6 | 38.2 | 11 | 17.4 |
| Internal haze | 30.5 | 33.0 | 0 | 3.4 |
| Surface haze | 4.1 | 5.2 | 11 | 14 |
| Transmittance (%) | 93.3 | 93.1 | 93.3 | 93.6 |
| Image clarity | 177 | 163 | 100 | 108 |
| Sparkling | None | None | Occurred | Slightly occurred |
| Black density | 1.96 | 1.95 | 1.80 | 1.88 |

As seen in Table 1, the coating compositions of the present invention comprising a binder resin, fine particles whose refractive index varying between 0.2 to 0.5 from the refractive index of the binder resin and whose average particle size ranging from 0.05 to 1 μm, and fine particles whose refractive index varying between 0.1 from the refractive index of the binder resin and whose average particle size ranging from 0.5 to 3 μm (Examples 1 and 2) were superior in terms of transmittance, haze, image clarity, and sparkling to those of Comparative Examples 1 and 2.

As explained above, an antiglare coating composition of the present invention has a superior antiglare effect, reduced image distortion, high contrast, and enhanced image clarity when applied to a high-resolution display by reducing surface scattering and inducing internal diffusion of light.

What is claimed is:

1. An antiglare film comprising a substrate; and an antiglare coating composition coated on the substrate, the antiglare coating composition comprising:
   a) acrylate binder resin;
   b) 2 to 30 wt % of inorganic fine particles selected from a group consisting of alumina, aluminum hydroxide, magnesium oxide, antimony oxide, and silica having an average particle size ranging from 0.4 μm to less than 1 μm, wherein the refractive index of the fine particles varies between 0.2 to 0.5 from the refractive index of the acrylate binder resin, based on the weight of acrylate binder resin; and
   c) 1 to 20 wt % of inorganic fine particles selected from a group consisting of alumina, aluminum hydroxide, magnesium oxide, antimony oxide, and silica, having an average particle size of 1 to 3 μm, wherein the refractive index of the fine particles varies within 0.1 from the refractive index of the acrylate binder resin, based on the weight of acrylate binder resin, and
   wherein the internal diffusion haze of the film ranges from 15 to 40 and surface haze of the film is less than 15.

2. The antiglare film according to claim 1, wherein the substrate is selected from the group consisting of triacetyl cellulose, polyester film, polymethylmethacrylate (PMMA), and polycarbonate (PC).

3. An antiglare coated sheet coated with an antiglare coating composition, the antiglare coating composition comprising:
   a) acrylate binder resin;
   b) 2 to 30 wt % of inorganic fine particles selected from a group consisting of alumina, aluminum hydroxide, magnesium oxide, antimony oxide, and silica, having an average particle size ranging from 0.4 μm to less than 1 μm, wherein the refractive index of the fine particles varies between 0.2 to 0.5 from the refractive index of the acrylate binder resin, based on the weight of acrylate binder resin; and
   c) 1 to 20 wt % of inorganic fine particles selected from a group consisting of alumina, aluminum hydroxide, magnesium oxide, antimony oxide, and silica, having an average particle size of 1 to 3 μm, wherein the refractive index of the fine particles varies within 0.1 from the refractive index of the acrylate binder resin, based on the weight of acrylate binder resin, and
   wherein the internal diffusion haze of the film ranges from 15 to 40 and surface haze of the film is less than 15.

4. The antiglare film according to claim 1, wherein the antiglare coating composition further comprises one or more additives selected from a group consisting of a leveling agent, a wetting agent, and an antifoaming agent.

5. The antiglare film according to claim 1, wherein the antiglare coating composition comprises:
   a) acrylate binder resin comprising
      i) up to 80 wt % of a reactive oligomer,
      ii) 10 to 100 wt % of a multifunctional monomer, and
      iii) up to 30 wt % of one or more bifunctional or monofunctional acrylate and methacrylate;
   b) 2 to 30 wt % of inorganic fine particles selected from a group consisting of alumina, aluminum hydroxide, magnesium oxide, antimony oxide, and silica, having an average particle size ranging from 0.4 μm to less than 1 μm, wherein the refractive index of the fine particles varies between 0.2 to 0.5 from the refractive index of the acrylate binder resin, based on the weight of acrylate binder resin;
   c) 1 to 20 wt % of inorganic fine particles selected from a group consisting of alumina, aluminum hydroxide, magnesium oxide, antimony oxide, and silica, having an average particle size of 1 to 3 μm, wherein the refractive index of the fine particles varies within 0.1 from the refractive index of the acrylate binder resin, based on the weight of acrylate binder resin;
   d) 0.01 to 10 wt % of an initiator, based on the weight of acrylate binder resin; and e) 10 to 200 wt % of a solvent, based on the weight of acrylate binder resin.

6. The antiglare film according to claim 5, wherein the reactive oligomer is one or more compounds selected from the group consisting of a urethane-modified oligomer, a polyester oligomer, and an epoxy oligomer having 2 to 6 functional groups.

7. The antiglare film according to claim 5, wherein the multifunctional monomer is one or more compounds selected from the group consisting of dipentaerythritol hexaacrylate, pentaerythritol tetraacrylate, pentaerythritol triacrylate, and trimethylene propyl triacrylate.

8. The antiglare film according to claim 5, wherein the bifunctional or monofunctional acrylate or methacrylate is one or more compounds selected from the group consisting of ethyl acrylate, butyl acrylate, isobornyl acrylate, octadecyl acrylate, 2-hydroxyethyl acrylate, methyl methacrylate, butyl methacrylate, hexanediol diacrylate, dipropylene glycol diacrylate, triethylene glycol diacrylate, tripropylene glycol diacrylate, and methacrylate.

9. The antiglare film according to claim 5, wherein the initiator is one or more compounds selected from the group consisting of benzoylperoxide, 1-hydroxy cyclohexylphenyl ketone, benzyl dimethyl ketal, hydroxydimethylacetophenone, benzoin, benzoin methyl ether, benzoin ethyl ether, benzoin isopropyl ether, and benzoin butyl ether.

10. The antiglare film according to claim 5, wherein the solvent is one or more compounds selected from the group consisting of methanol, ethanol, isopropanol, methyl acetate, ethyl acetate, butyl acetate, methyl ethyl ketone, methyl isobutyl ketone, acetone, methyl cellosolve, ethyl cellosolve, butyl cellosolve, dimethyl formamide, and tetrahydrofuran.

11. The antiglare film according to claim 1, wherein the b) inorganic fine particles have an average particle size of 0.4 to 0.6 μm.

12. The antiglare film according to claim 5, which has an average surface roughness (Ra) of 0.1 to 0.3 μm.

* * * * *